(12) United States Patent
Citak

(10) Patent No.: US 11,234,415 B2
(45) Date of Patent: Feb. 1, 2022

(54) TOY FOR STIMULATING THE INTELLIGENCE OF DOGS

(71) Applicant: Andrzej Citak, Raasdorf (AT)

(72) Inventor: Andrzej Citak, Raasdorf (AT)

( * ) Notice: Subject to any disclaimer, the term of this patent is extended or adjusted under 35 U.S.C. 154(b) by 437 days.

(21) Appl. No.: 16/349,468

(22) PCT Filed: May 11, 2017

(86) PCT No.: PCT/AT2017/060125
§ 371 (c)(1),
(2) Date: May 13, 2019

(87) PCT Pub. No.: WO2018/090066
PCT Pub. Date: May 24, 2018

(65) Prior Publication Data
US 2020/0187456 A1    Jun. 18, 2020

(30) Foreign Application Priority Data

Nov. 16, 2016 (AT) .............................. A51039/2016

(51) Int. Cl.
*A01K 15/02* (2006.01)
*A63F 9/06* (2006.01)

(52) U.S. Cl.
CPC .......... *A01K 15/025* (2013.01); *A63F 9/0601* (2013.01)

(58) Field of Classification Search
CPC ................................ A01K 15/025; A63F 9/06
See application file for complete search history.

(56) References Cited

U.S. PATENT DOCUMENTS

| 2011/0253049 A1 | 10/2011 | Fukuda et al. |
| 2011/0253059 A1 | 10/2011 | Wong |
| 2014/0224185 A1 | 8/2014 | Hansen |

FOREIGN PATENT DOCUMENTS

| AT | 516156 B1 * | 3/2016 | ........... A01K 15/025 |
| AT | 516156 B1 | 3/2016 | |
| CN | 202285807 U | 7/2012 | |
| DE | 202006010218 U1 | 11/2006 | |
| DE | 202008011741 U1 | 1/2009 | |
| DE | 202008011742 U1 | 1/2009 | |
| WO | 2014081376 A1 | 5/2014 | |

* cited by examiner

*Primary Examiner* — Timothy D Collins
*Assistant Examiner* — Brittany A Lowery
(74) *Attorney, Agent, or Firm* — Laurence A. Greenberg; Werner H. Stemer; Ralph E. Locher

(57) ABSTRACT

A toy for stimulating the intelligence of dogs has a basic body into which food rewards can be introduced. Movable panels define different functional levels. The panels have apertures and are arranged one above the other in the body. Two top sub-panels that close of the upper side of the body can be pushed apart from one another by the dog's paw. An access panel underneath has retaining bracket which allows the dog's paw to lift it out in the upward direction. Retaining pins pass through apertures in the panel. A sliding panel, which is underneath, has an oblong opening through which likewise removable arresting pins and special arresting pins can pass. The sliding panel can only be displaced by the dog and drawn out of the body in order for the food reward to be exposed to the dog after the locking and arresting pins have been removed.

13 Claims, 9 Drawing Sheets

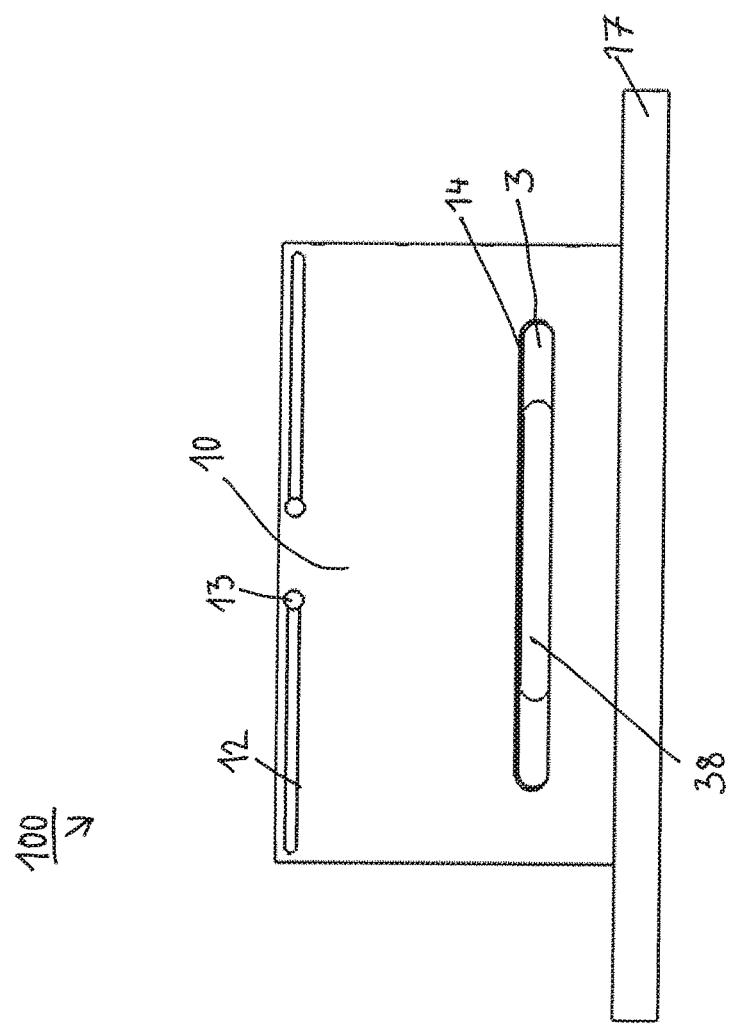

TOY FOR STIMULATING THE INTELLIGENCE OF DOGS

BACKGROUND OF THE INVENTION

Field of the Invention

The invention relates to a new toy for stimulating the intelligence of dogs with a preferably rectangular or cube-shaped body with base panel projecting laterally on the underside of the same, into which body small food rewards, in particular treats, can be placed, wherein at least two panels which are horizontal, parallel to one another, provided with recesses and movable are arranged in the inner space thereof at distances above one another, corresponding to a multiplicity of functional levels, of which panels at least one panel is formed as a sliding panel which can be inserted on both sides through slot-like recesses arranged in opposite body side walls and which can be pulled out by the dog.

Various toys for animals, in particular for dogs, are known from the prior art, which toys are supposed to engage the dog in play and additionally bring about a learning or training effect. These games normally have a relatively simple structure and reward the dog in the event of success for the solution with an edible reward in the form of a normal treat. The toys which are currently commercially available and known are, however, usually solved directly and by applying the principle of trial and error, as a result of which the learning effect for the dog remains within narrow limits. The toys also enable barely any or no variance in the complexity of the problems to solve with the result that the games quickly become uninteresting for the animal.

DE 202008011742 U1 describes a dog toys, comprising a hollow cylinder in which at least two sliding panels arranged on top of one another can be inserted and pulled out reversibly by the dog through lateral recesses slots in order to convey the treat to the output opening.

US 20110253059 and DE 202008011741 describe multifunctional animal toys.

Austrian Patent No. AT 516156 B1 describes a toy for stimulating the intelligence of dogs with a preferably rectangular or cube-shaped body with base panel projecting laterally on the underside of the same, into which body small food rewards, in particular treats, can be placed, wherein at least two panels which are horizontal, parallel to one another, provided with recesses and movable are arranged in the inner space thereof at distances above one another—corresponding to a multiplicity of functional levels (I-IV)—of which panels at least one panel is formed as a sliding panel which can be inserted on both sides through slot-like recesses arranged in opposite body side walls and which can be pulled out by the dog.

US 2014/0224185 A1 discloses a game for stimulating the cognitive skills of domestic animals with a two-part displaceable cover.

DE 202008011741 U1 shows in FIG. 1 and DE 202006010218 U1 shows in FIG. 5 further examples of dog toys in the case of which a cover must be displaced or pivoted, wherein the toy according to DE 202006010218 U1 can be expanded with variable modules.

WO 2014/081376 A1 relates to a motivational game for domestic animals in the case of which a locking element must be displaced to a specific location in order to be removable. The level of difficulty can be increased in this case.

US 2011/0253059 A1 and CN 202285807 U disclose further examples of toys which stimulate the intelligence of domestic animals in the case of which locking elements have to be removed in order to reach an edible reward. According to the Chinese publication, the covering elements also have "scent channels" and both of these toys are to be regarded as complex challenges for the animal which is playing with them.

BRIEF SUMMARY OF THE INVENTION

The object of the present invention is to create a toy for dogs which avoids disadvantages of known games, maintains the interest of the dog in the toy for a particularly long time and ensures its long-term and frequently recurring interaction along with a simultaneously high and gradually increasing learning effect.

In particular the object of the invention lies in the creation of a toy for dogs with rapidly and simultaneously complexly changeable and exchangeable demands on physical and mental capabilities and in particular on the intelligence and learning capacity of the dog.

This object is achieved in the case of a toy corresponding to several degrees of difficulty with increasing demands on intelligence of the above-mentioned type with the combination of features as claimed.

In the case of this new toy, it is provided according to the invention that the body—corresponding to a first functional level—has on the upper side two partial covering panels arranged horizontally and parallel to the stated panels with their two facing edges at a dog paw-accessible distance from one another and can be slid laterally out of one another by the dog under the full upper-side opening of the body and can finally be swiveled into a vertical position parallel to the two side surfaces of the body or bearing against them, that there is arranged thereunder—corresponding to a second functional level—an access panel which is provided with an upper-side dog paw- or teeth-accessible retaining bracket and at least one recess through which a locking pin which is to be removed in advance by the dog passes and can be lifted out of the body upward by the dog by means of this retaining bracket, below which a sliding panel—forming a third functional level—through which at least one locking pin to be removed in advance by the dog and at least one special locking pin which can also be removed by the dog only after deliberate lateral displacement pass, runs approximately diagonally and centrally has a slot-like longitudinal recess having an expansion on both sides, and that below it there is located a special locking pin holder or base panel—corresponding to a fourth functional level—where applicable, fastened in the body having a substantially identical surface area, configuration and identical or similar orientation to the diagonal longitudinal recess of the sliding panel, by means of which at least one special locking pin which is equipped with a projecting base edge zone and is engaged over by the two-sided edges of the diagonal longitudinal recess is displaceable in the longitudinal recess and can only be removed upward via its central expansion zone, with it only being possible for the sliding panel to be displaceable by the dog and pulled out of the body thereafter.

In the pushed-in state, the panels bring about a spatial delimitation and division of the body into "functional regions" or compartments which lie on top of one another.

Several locking elements which can be inserted reversibly and removed by the dog, for example, pin-type locking elements, are therefore provided which can be brought into mechanical interaction both with the upper panel and with a lower sliding panel, wherein, when the locking pin is inserted, a locking or blocking of the access panel and the sliding panel arises and lifting or pulling out of the body is prevented and is only possible after corresponding removal of the locking pins.

What is important here is a continuous scent channel which extends through the locking pin, which passes through the two panels, and which establishes an open scent connection between the nose of the dog and a treat placed e.g. at the base or close to the base of the body.

This scent connection between the treat and the nose of the dog is important because the dog is motivated by the scent of the treat to ultimately reach the treat and in this manner solve the problem by overcoming the individual functional levels.

At the same time, the locking pins, however, also satisfy the further function of the mechanical interaction and the locking of the panels in a mechanically and structurally advantageous manner. The provision of the locking pin(s) which lock(s) the panels causes the dog to have to identify a causal link between his/her actions and adjust his/her behavior accordingly.

In the case of the new toy, the dog does not arrive at the objective in the short term by means of trial and error since a removal and the pushing out of the panels is not possible before he/she has not removed the locking pin(s). It is only then that each of the panels can be successively detected and lifted or pulled out by the animal, wherein the sequence is additionally relevant here.

The game means that the dog learns to identify a specific sequence of his/her actions and adapt his/her sequence of actions accordingly. The final success is, however, not directly achieved and rewarded in this case, as is the case in previously known games, if the dog immediately finds a treat, for example, in a drawer which can be pulled out or behind a flap to be opened or the like.

In the case of the new game, the dog must put several steps of action in the correct sequence in order to reach the final reward. If he/she does not order the steps or tries to put the steps in an unintended sequence, by virtue of the fact that he/she first tries, for example, to pull out the sliding panels, he/she will not be successful.

Only the satisfaction of the intended prerequisites enables the solution to the game. In this manner, a long-term, intensive activity with long-lasting learning success is ensured and it is guaranteed that the dog does not start to become bored with the new game even after frequent activity.

Further advantageous configurations of the invention are achieved by the following features:

It is thus provided that recesses are provided in the panel of the second functional level to be lifted out and in the sliding panel of the third functional level and the locking pin(s) can be passed reversibly through these recesses or introduced reversibly into these recesses or, vice versa, removed from there. As a result of the constructive manner of the mechanical interaction between the locking pin(s) and the recesses, the game is robust, long-lasting, physically easy to operate and operationally safe.

In this context, it is advantageously provided that there is provided in the panel which is to be lifted out of the cube at least one continuous recess which passes fully through this panel and in the sliding panel located thereunder at least one non-continuous (blind) recess so that the dog is forced to firstly remove the locking pin(s) in order to lift out of the body and discard the access panel of the second functional level by means of a retaining bracket after already completed entire pushing apart and lateral folding up of the two partial covering panels of the first functional level.

In order to initially achieve a per se uncomplicated pushing apart of the two partial covering panels by the dog, which is followed by its "recognition" that this is not sufficient to reach a desired treat, in order therefore to remove the access panel arranged thereunder from the body, it is provided that each of the two partial covering panels is equipped on both sides in each case with a pivot pin projecting laterally from them and with which they engage in guide slots arranged in both sides, preferably in upper protrusion zones of the body, and are displaceable in each case up to their outer end and pivot points, from where the partial covering panels can then be folded vertically away and down.

In accordance with the bodily structure of the dog and the approximately human hand-equivalent functionality of its front paws, it is provided according to the invention that the sliding panel has on at least one of its face sides projecting out of the body a lug-type bow-shaped handle which can be operated, i.e. used by the dog.

It is of course particularly preferred if in each case such a bow-shaped handle is arranged on both lateral face sides of the sliding panel projecting at the front and rear out of the body in each case through a sliding slot which passes through its opposite side walls, which increases the variability of the new toy.

In order to make the process of pulling the sliding panel out of the body more difficult to a certain extent, it can be provided that there is arranged in the base panel of the body projecting laterally on the underside at least one blind recess into which a locking pin which passes through the handle recess of the bow-shaped handle of the sliding panel can be inserted, and that it is only after its removal by the dog that the sliding panel can be displaced and pulled out from the body.

In order to achieve a mutual locking of the panels of the various functional levels at the start of the game, it is provided that recesses of identical, preferably circular configuration through which the locking pins and/or the special locking pins can pass or be appropriately occupied and are linearly flush with one another and such blind recesses are arranged in the panels of the second to fourth functional levels.

In order to ensure the incentive caused by a treat for the dog to engage to a greater extent with the game cube and with the successive removal of the panels corresponding to the various functional levels therefrom, it is expedient if preferably each of the in particular substantially cylindrical locking pins and optionally also the special locking pins has a scent channel passing fully through it along its central main axis.

The sliding panel of the third functional level represents a particular challenge for the intelligence of the dog which increases to a varying degree of speed with the duration and number of games, wherein it is provided that the sliding panel of the third functional level outside the diagonal longitudinal recess with the preferably central expansion through which a locking pin passes or can pass additionally has at least one further special locking pin passing through this diagonal longitudinal recess and furthermore two recesses which are arranged approximately counter-diagonally and through which locking pins to be removed by the dog can also pass.

The playfulness of the dog can be easily challenged if it is ensured that the access panel of the second functional level which can be lifted upward out of the body by the dog by means of a lug-type retaining handle has two recesses which pass through these, which are passed through or can be passed through in each case by a locking pin and which are preferably arranged diagonally, wherein these two recesses of the access panel which can be lifted out with two recesses or blind recesses of the sliding panel of the third functional level are arranged congruently.

It is not least advantageous in the sense of stimulating the intelligence of the dog in the context of its activity with the new toy if at least one blind recess is arranged in the special locking pin holder panel, where applicable, fixed in the body, in which blind recess the edible reward for the dog can be arranged.

The invention is explained in greater detail on the basis of the drawing.

BRIEF DESCRIPTION OF THE SEVERAL VIEWS OF THE DRAWING

In each case in perspective representation,

FIG. 8 shows the toy in the closed state and FIG. 9 shows the body of the closed toy in a side view.

DESCRIPTION OF THE INVENTION

Figure 1:
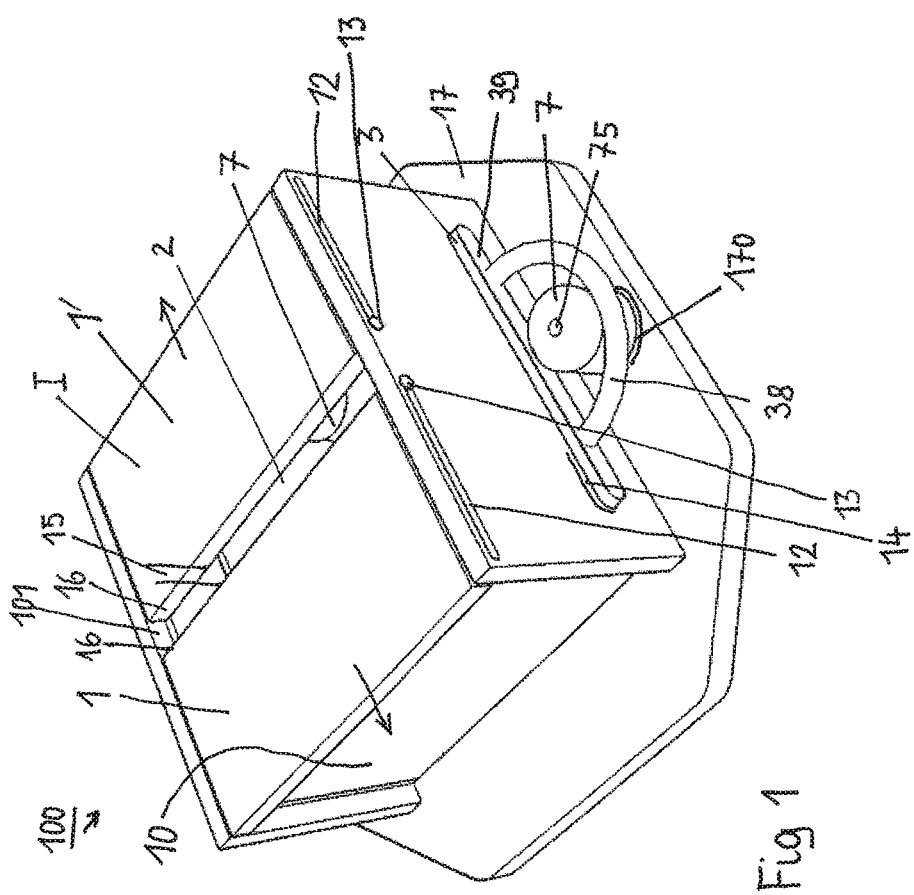
FIG. 1 shows the new toy which stimulates the animal intelligence of dogs in a closed state prior to the start of play or after the end of play when it has been reassembled by the animal owner.

FIG. 1 shows the approximately cubic firm of cube 10 which is characteristic of new dog toy 100 with an underside base panel 17 projecting all around with a circular blind recess 170 into which a locking pin 7 which can be removed from it by the dog with axial scent channel 75 is inserted in an appropriate manner.

On the upper side, body 10 has two—jointly forming a first functional level I—divided covering panel formed with two partial covering panels 1, 1' which are mutually horizontally displaceable or can be slid out of one another, wherein, for the capacity of partial covering panels 1, 1' to slide out of one another, protrude in each case from both sides laterally out of the same guide pins 13 which project outward into guide slots 12 which are arranged on both sides, horizontal and incorporated into protrusions 101 of body 10.

There remains between both mutually facing edges 16 of both partial covering panels 1, 1' in the "closed ideal state" shown of new toy 100 a gap 15 into which the dog can reach, for example, with a paw at the start of play and push both partial covering panels 1, 1' apart in each case in the direction of the arrows.

As a result of gap 15, the view of access panel 2—forming second functional level II—which can be lifted upward out of body 10 is exposed, the circular recess of which is penetrated by a preferably substantially approximately cylindrical locking pin 7.

There projects out of sliding slot 14 incorporated here in front-side side wall 11 of body 10 sliding panel 3—corresponding to third functional level III—on face wall 39 of which a lug-type retaining handle 38 is fixed by means of which, after removal of locking pin 7 from its blind recess 170 in base panel 17, said sliding panel 3 can be pulled by the dog out of body 10 with his/her own skill.

Figure 2:
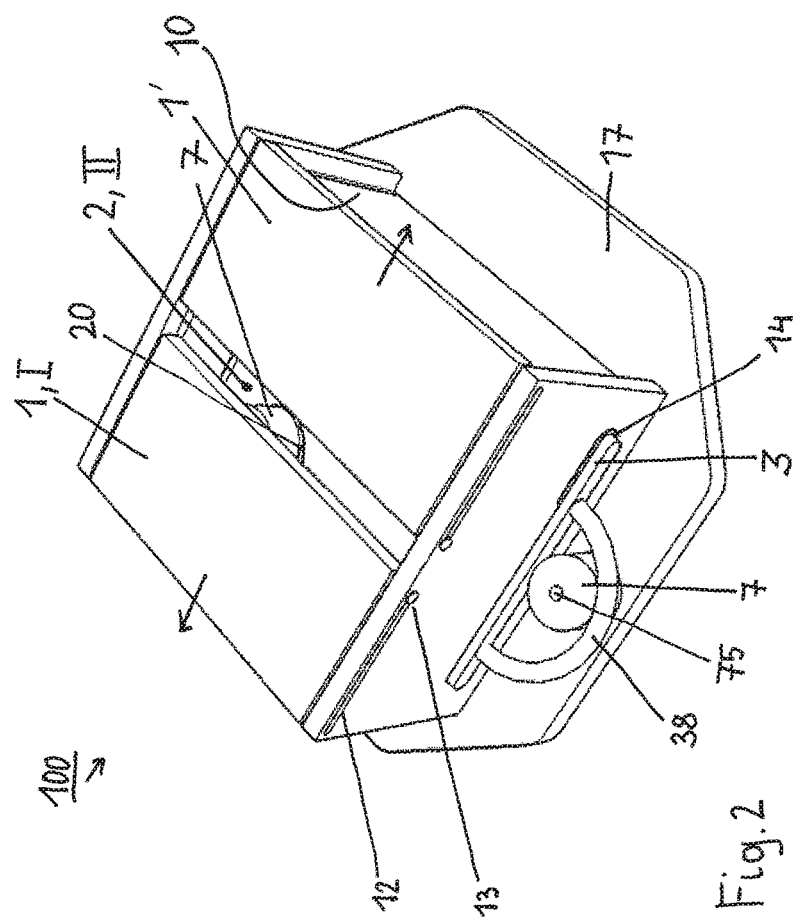
FIG. 2 shows the same toy in the same state, but from the "other" or rear side.

With otherwise the same reference number meanings, FIG. 2 shows the same toy body 10 in the same state as FIG. 1, only from the other side, wherein here the view of locking pin 7 protruding through recess 20 in access panel 2 or inserted into recess 20 is slightly clearer than in FIG. 1.

Figure 3:
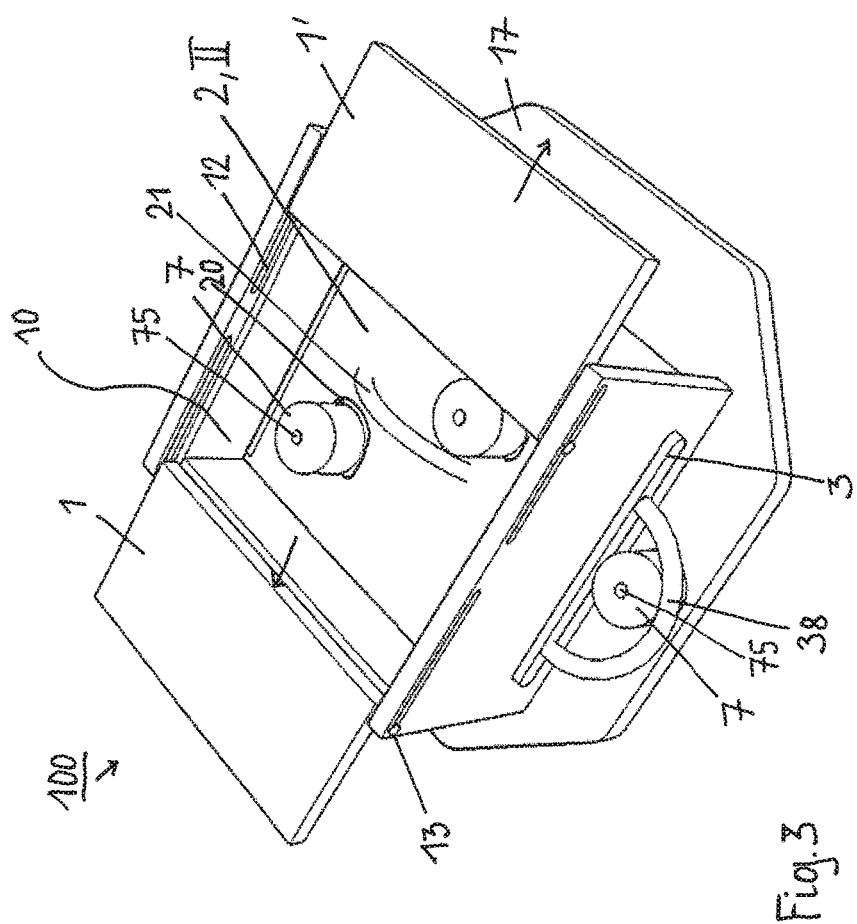
FIG. 3 shows the new toy after it has already been largely opened by the dog, wherein the rear partial covering panel has already been displaced up to the pivot stop and the front partial covering panel is still in the displacement state, wherein the access panel which is arranged thereunder and can be lifted out is already largely visible.

With otherwise the same reference number meanings, in the case of body 10 largely opened on the upper side by the playing dog, practically the full view of access panel 2 to be lifted out of body 10 by the dog with two locking pins 7 in their recesses 20 which make lifting it out difficult or impossible is exposed in FIG. 3. After overturning and removal of these two locking pins 7 by the dog, it becomes possible for the dog to lift access panel 2 out of body 10 with grasping of retaining bracket 21 protruding upward out of it.

Figure 4:
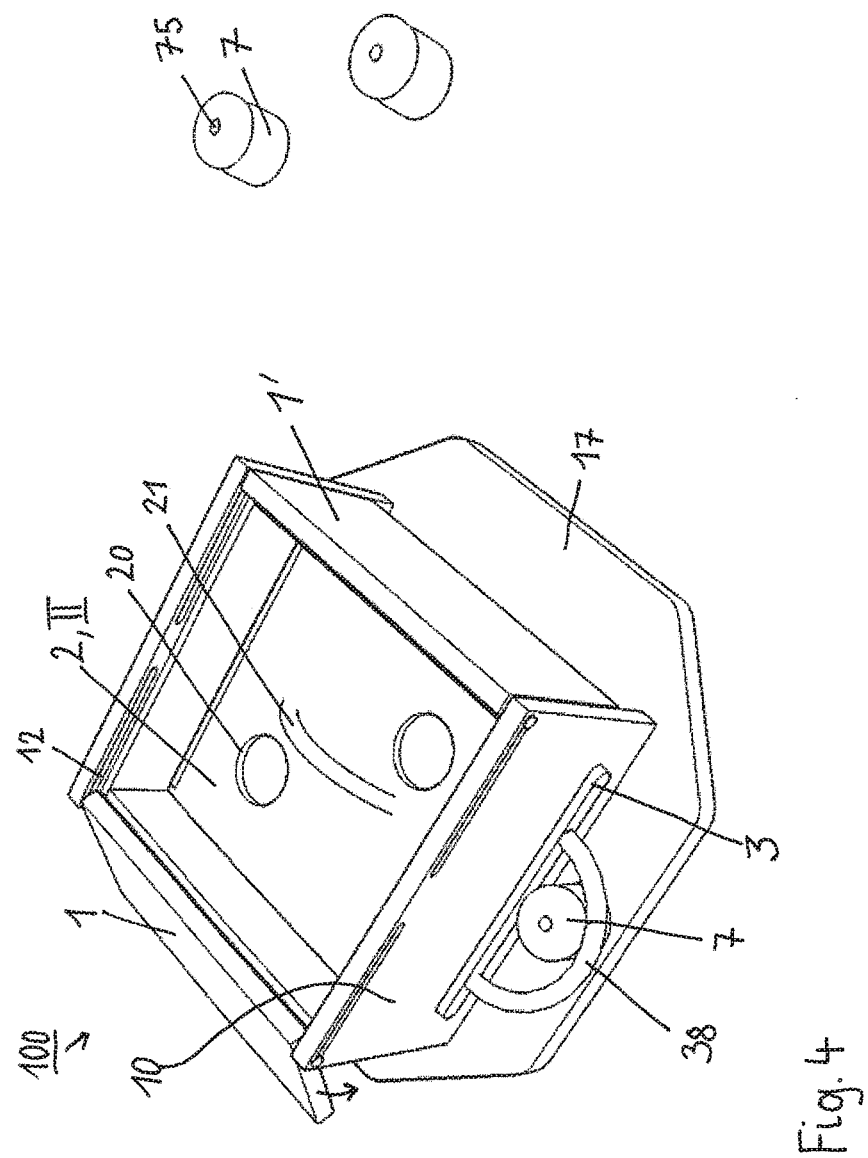
FIG. 4 shows the new toy during vertical folding up of the rear partial covering panel and in the case of a partial covering panel already folded up into the vertical position and position bearing against the body, from the locking pin recesses of which the two locking pins here have already been removed by the dog.

FIG. 4 shows—with otherwise the same reference number meanings—new toy 100 after completed removal of both locking pins 7 from access panel 2 in body 10, wherein both recesses 20 are now fully visible for locking pin 7 which passes through it and in the case, as shown, of fully folded down partial covering panels 1, 1' nothing stands any longer in the way of the ultimately required lifting of said panel 2 out of body 10 with the aid of its retaining bracket 21.

Figure 5:
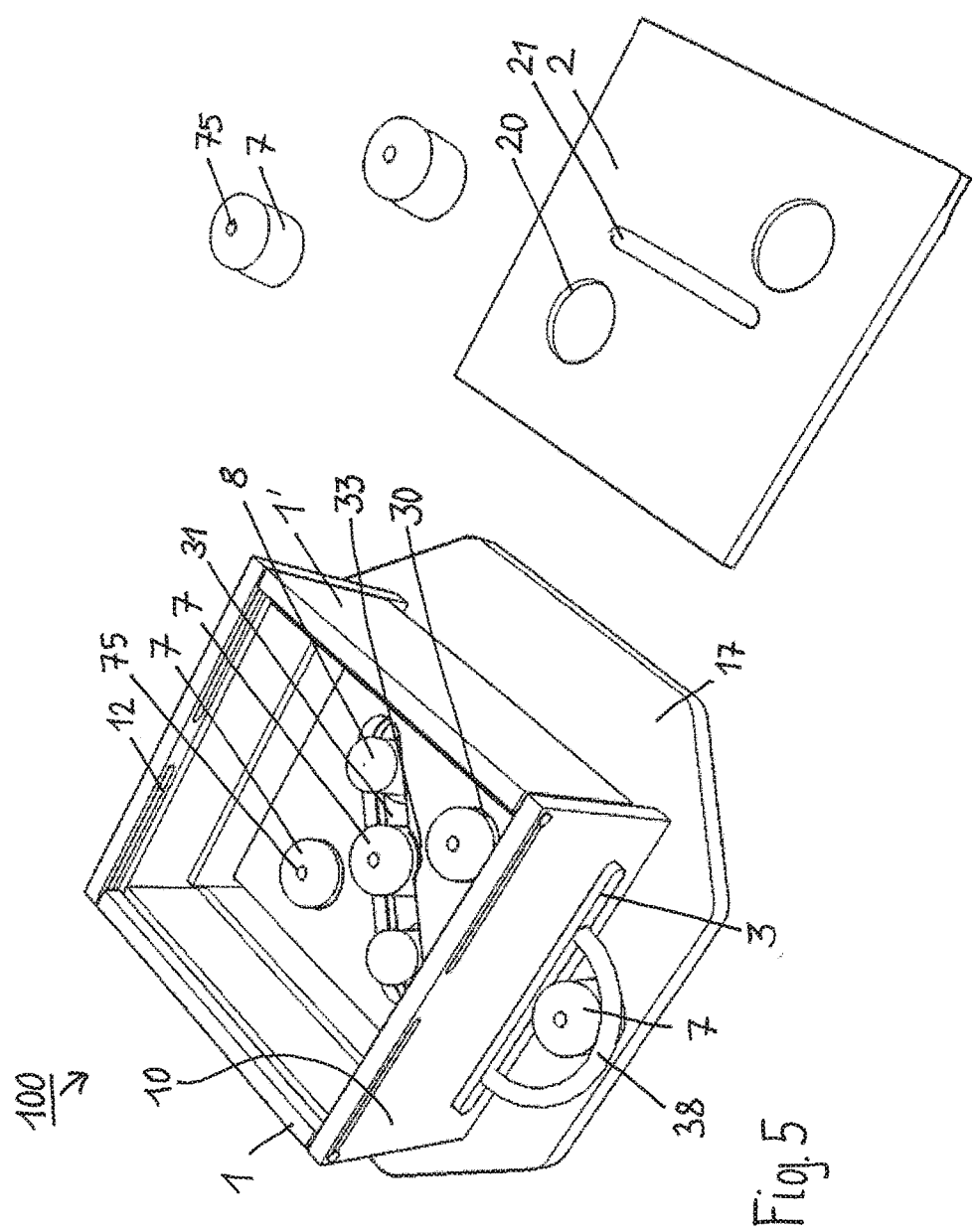
FIG. 5 shows this toy once the dog has succeeded in lifting the access panel out of the body and placed it with the two locking pins already removed from it, wherein the view of the sliding panel which is secured against lateral displacement their recesses by locking pins and special locking pins is exposed.

FIG. 5 shows—with otherwise the same reference number meanings—body 10 of new toy 100 after completed lifting out of access panel 2 and its storage next to it. The view of sliding panel 3—corresponding to third functional level III—which is horizontally displaceable and ultimately can be pushed fully out of body 100 with "diagonally" arranged, elongated main longitudinal recess 31 with central, two-sided expansion 33 and two "counter-diagonally" arranged, circular recesses 30, through which locking pins 7 pass which prevent any displacement of sliding panel 3 is now exposed.

Two special locking pins 8, preferably also approximately cylindrical, pass through longitudinal opening or recess 31 of sliding panel 3 on both sides of its central expansion 33, which locking pins 8 cannot be removed by the dog by simply pulling out or the like, with which, after completed removal of both locking pins 7 from both circular recesses 30, sliding panel 3 can furthermore still not be pulled laterally out of body 10 by the dog and this state of non-displaceability of sliding panel 3 is fully maintained even if locking pin 7 which passes through central expansion 33 of longitudinal opening 31 has already been removed by the dog.

It is only when both special locking pins 8 have been displaced along the two arms of longitudinal recess 31 of sliding panel 3 successively into their central expansion 33 and then pulled out successively from this expansion 33 that the displacement of sliding panel 3 by lateral pulling out of body 10 can be successful.

Figure 6:
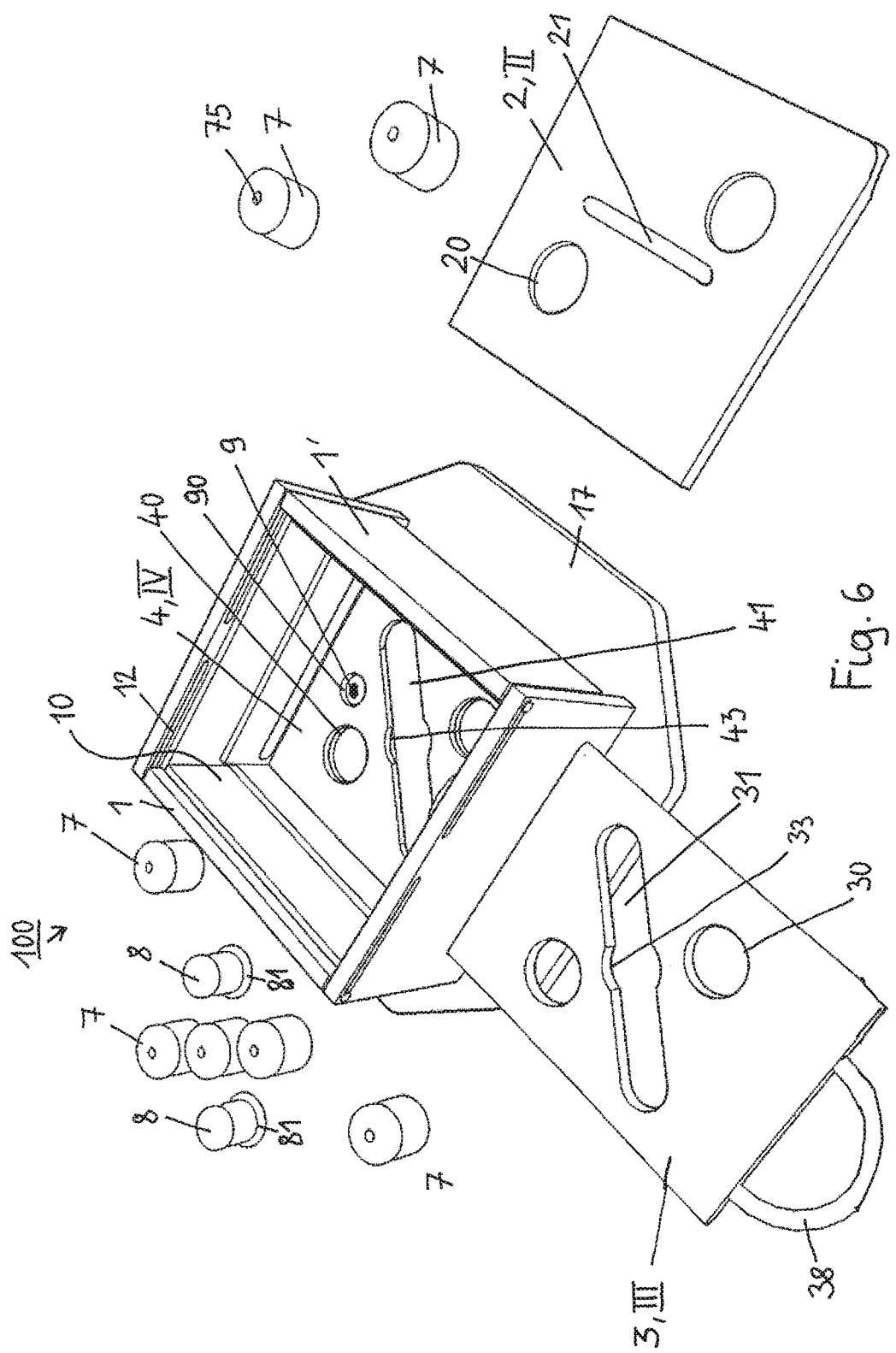
FIG. 6 shows the toy after the dog has succeeded, on the one hand, in removing both the conventional locking pins and also the special locking pins from the sliding panel blocked by them and thereafter pulling it upward out of the body, as a result of which the ground panel in the body provided for the retention of the special locking pins which is particularly difficult to overcome is visible.

FIG. 6 explains in greater detail the state achieved as a result of the new animal teaching toy 100—with otherwise the same reference number meanings—wherein is exposed after completed removal of locking pins 7 from both recesses 30, and from expansion 33 and special locking pins 8 out of both arms of longitudinal recess 31 of sliding panel 7 and if furthermore the two "outer" locking pins 7 which pass through retaining handles 38 of sliding panel 3 and thus block it have been removed by the dog.

Only then can sliding panel 3 be pulled out of body 10, as a result of which ultimately the view of ground panel 4—forming fourth functional level IV—arranged, preferably fixedly, in body 10 and spaced apart from actual base panel 17 is exposed.

Said base panel 4 has here a round blank recess 90 in which treat 9 provided for the dog having successfully completed the game is stored and for the finding and consuming of which the dog would have to explore the four functional levels I to IV provided in the case of the game according to the invention.

Longitudinal recess 41 configured congruently with longitudinal recess 31 with central expansion 33 with likewise central expansion 43 of ground panel 4 serves to further retain both special locking pins 8, wherein they engage under or behind the longitudinal edges of both arms of longitudinal recess 41 with their under-side, full circumference, ring-type projections 81 and therefore can only be lifted out upward after displacement of said locking pins 8 out of the two arms of longitudinal recess 41 into expansion 33 of longitudinal recess 31 of sliding panel 3.

Figure 7:
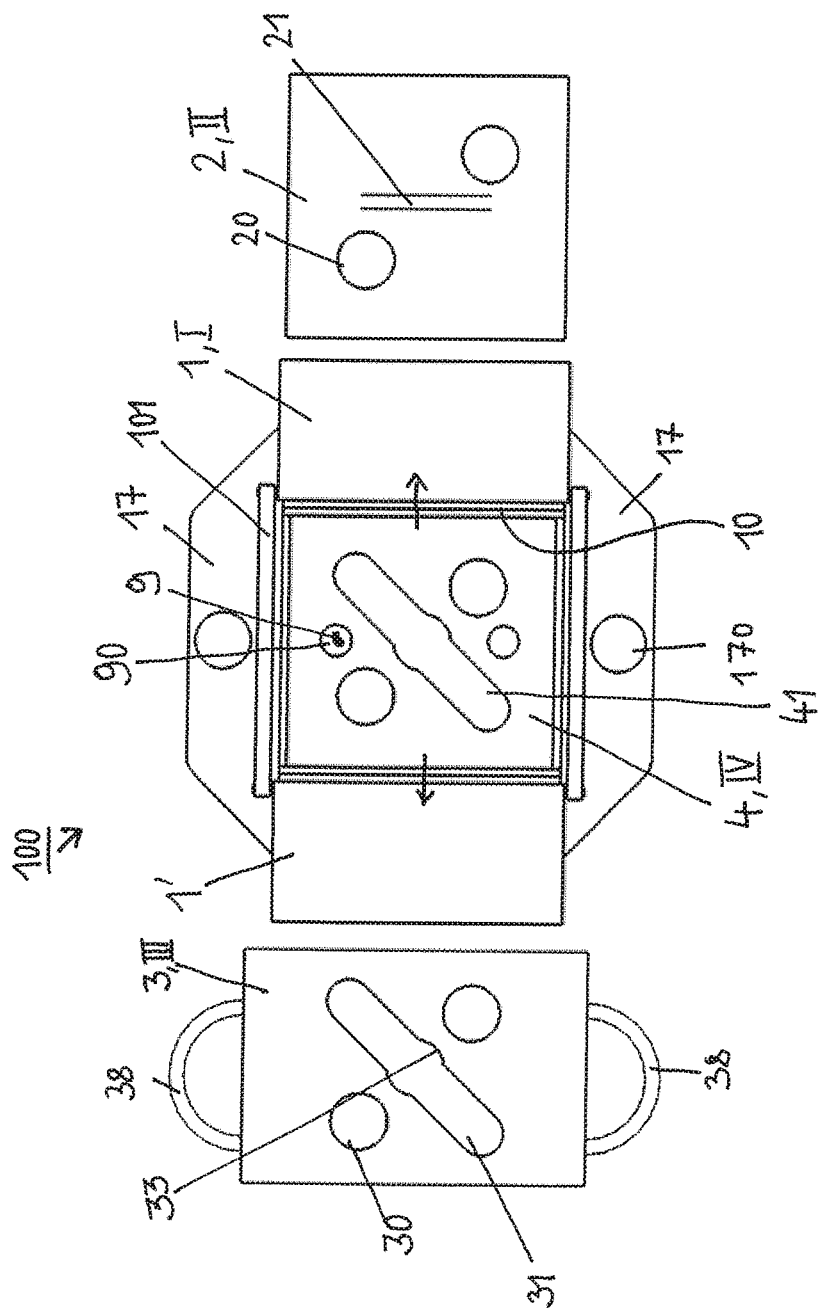
FIG. 7 further shows in a view from above the new dog toy with partial covering plates which are fully pushed apart by the dog, wherein both the access panel and the sliding panel are lifted out or pulled out of the body and placed on both sides of the body and the view of the ground panel which is preferably fixed in the body of the toy and cannot be lifted out or displaced is exposed.

FIG. 7 shows—with otherwise the same reference number meanings—in top view the state of new dog toy 100 with body 10, of which both partial covering panels 1, 1'—forming first functional level I—are pulled apart and folded up fully up to the pivot point and thus the view of the lowest—forming fourth functional level IV—base panel 4 advantageously fixed in cube 10 with two-armed longitudinal opening 41 and its expansion opening 43 and here two blind recesses 90 which are equipped with edible rewards 9 is exposed.

Sliding panel 3 of third functional level III pulled out from the same and access panel 2 of second functional level II already lifted out upward by the dog from cube 10 are placed laterally to the right and left of body 10.

Figure 8:
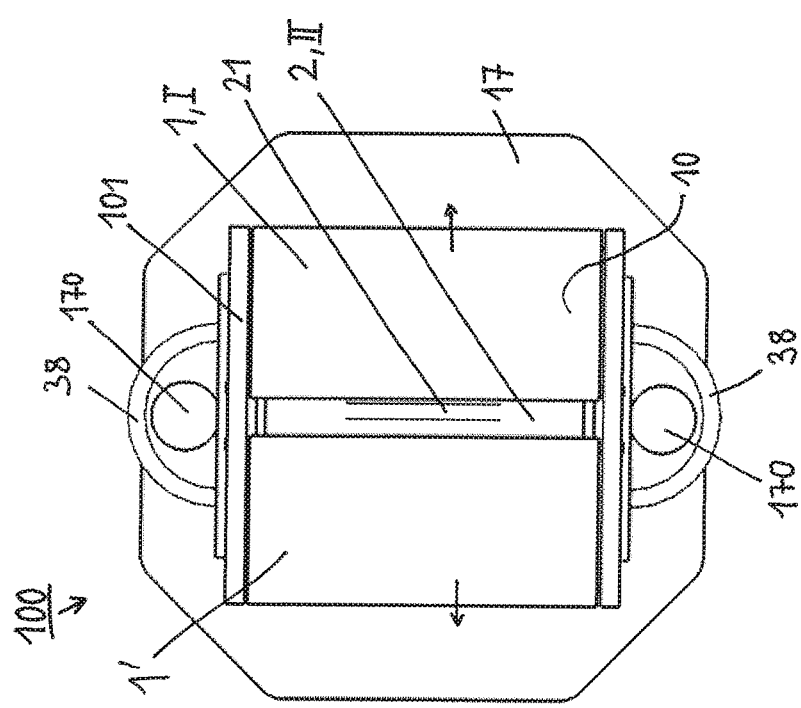

FIGS. 8 and 9 show—with otherwise the same reference number meanings—once again new toy 100 which stimulates the intelligence of dogs according to the present invention in a closed state, for example, prior to the start of play, and indeed FIG. 8 in plan view and FIG. 9 in side view.

The invention claimed is:

1. A toy for stimulating the intelligence of dogs, the toy comprising:

a body formed with an upper-side opening, side surfaces, a base panel projecting laterally on an underside of said body, and an inner space for receiving food rewards therein;

two partial covering panels closing off said upper-side opening and defining a first functional level, said covering panels having two facing edges disposed at a dog paw-accessible spacing distance from one another and being formed to be slid laterally apart from one another by the dog to fully expose said upper-side opening of said body and to be swiveled into a substantially vertical position parallel to and/or bearing against said two side surfaces of said body;

an access panel arranged underneath said covering panels and defining a second functional level, said access panel having an upper-side dog paw-accessible or teeth-accessible retaining bracket and at least one recess through which a locking pin, to be removed in advance by the dog, passes and can be lifted upward and out of said body by the dog by way of said retaining bracket;

a sliding panel disposed underneath said access panel and defining a third functional level, said sliding panel allowing a locking pin to pass and be removed in advance by the dog and at least one special locking pin to pass and be removed by the dog only after deliberate lateral displacement of said sliding panel, said sliding panel being formed with an approximately diagonal and central slot-shaped first diagonal elongated recess having an expansion on both sides; and a special locking pin holder or ground panel disposed underneath said sliding panel and defining a fourth functional level, said special locking pin holder or ground panel having a diagonal second elongated recess substantially corresponding to said first diagonal elongated recess of said sliding panel in terms of identical surface area, configuration and identical or similar orientation, by way of which diagonal elongated recess at least one special locking pin which is equipped with a projecting base edge zone and is engaged over by said two-sided, linear edge portions of said first diagonal elongated recess is displaceable in said elongated recess and can only be removed upward via a central expansion, and wherein it is only possible for the sliding panel to be displaceable by the dog and pulled out of the body after a removal of said special locking pin.

2. The toy according to claim 1, wherein said body is rectangular or cube-shaped.

3. The toy according to claim 1, wherein each of said two partial covering panels is equipped on two sides thereof with a pivot pin projecting laterally therefrom and configured to engage in guide slots formed laterally thereof in said body, and wherein each said covering panel is slideable to an outer end and pivot point, from where said partial covering panel is foldable vertically away and downward.

4. The toy according to claim 1, wherein said sliding panel carries a lug-type bow-shaped handle on at least one face side thereof, said handle projecting out of said body and being configured to be actuated by the dog.

5. The toy according to claim 4, wherein:
said base panel of said body projecting laterally on the underside being formed with at least one blind recess into which a locking pin which passes through a handle recess of said bow-shaped handle of said sliding panel is insertable; and said sliding panel is displaceable and may be pulled out of said body only after a removal of said locking pin by the dog.

6. The toy according to claim 1, wherein said panels of said second, third, and fourth functional levels are formed with pass-through recesses or blind recesses of identical configuration, said pass-through recesses or blind recesses respectively enabling locking pins and/or said special locking pin to pass or be set down linearly flush with one another.

7. The toy according to claim 6, wherein said recesses are circular.

8. The toy according to claim 6, wherein each of said substantially cylindrical locking pins and optionally also said special locking pins are formed with a scent channel passing fully therethrough along a central main axis thereof.

9. The toy according to claim 1, wherein each of said locking pins and special locking pins are formed with a scent channel passing fully therethrough along a central main axis thereof.

10. The toy according to claim 1, wherein said sliding panel defining said third functional level, in addition to said diagonal elongated recess with said central expansion through which a locking pin passes or can pass, has at least one further special locking pin passing said diagonal elongated recess and is formed with two further recesses that are arranged approximately counter-diagonally and through which further locking pins to be removed by the dog can pass.

11. The toy according to claim 1, wherein said access panel defining said second functional level is formed with two pass-through recesses through which a locking pin can pass and which are arranged diagonally, wherein said two recesses of said access panel are formed congruently with two recesses or blind recesses formed in said sliding panel defining said third functional level.

12. The toy according to claim 1, wherein said special locking pin holder panel has at least one blind recess formed therein for receiving therein the edible reward for the dog.

13. The toy according to claim 12, wherein said special locking pin holder panel is affixed in said body.

* * * * *